Figure 4:
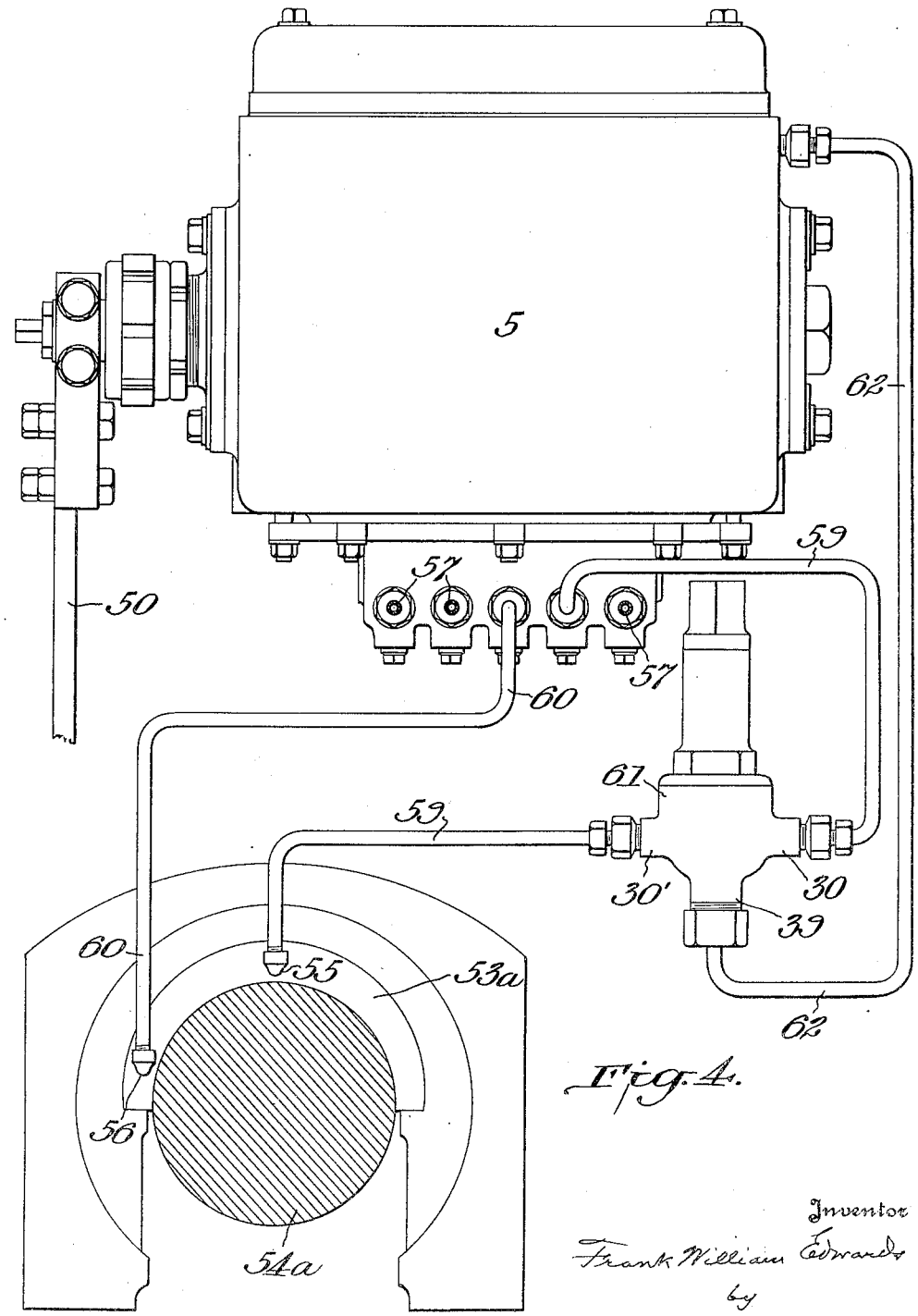

July 4, 1933.  F. W. EDWARDS  1,917,191
LUBRICATION ASSEMBLY FOR LOCOMOTIVES
Filed Dec. 6, 1930  5 Sheets-Sheet 1
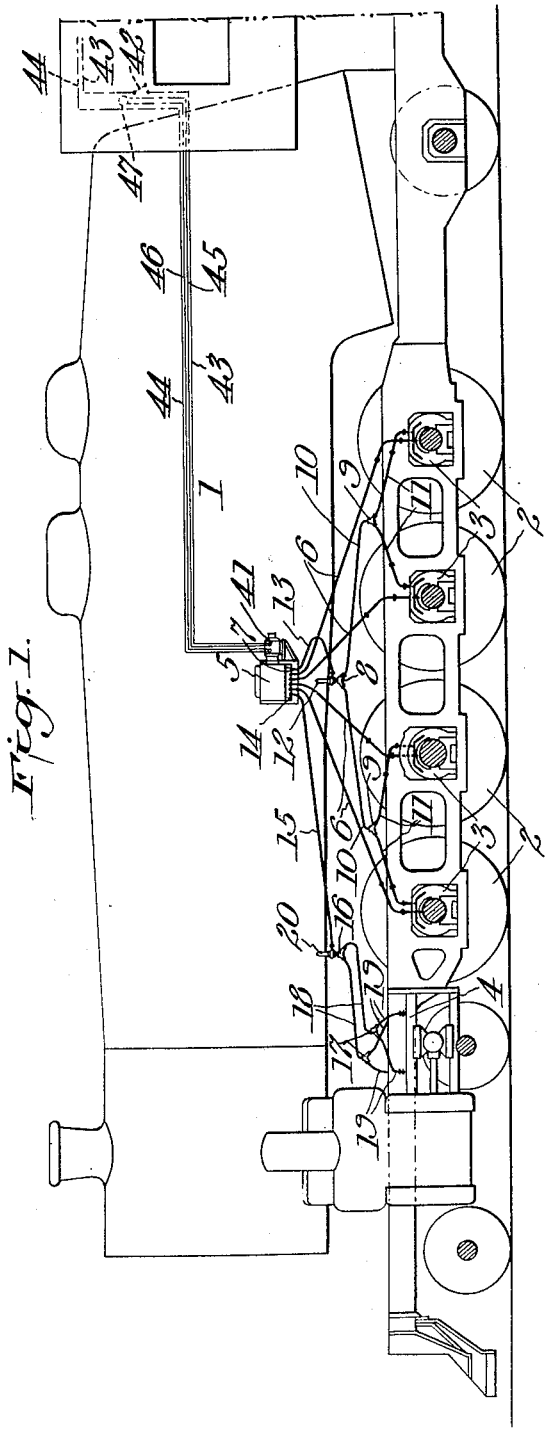
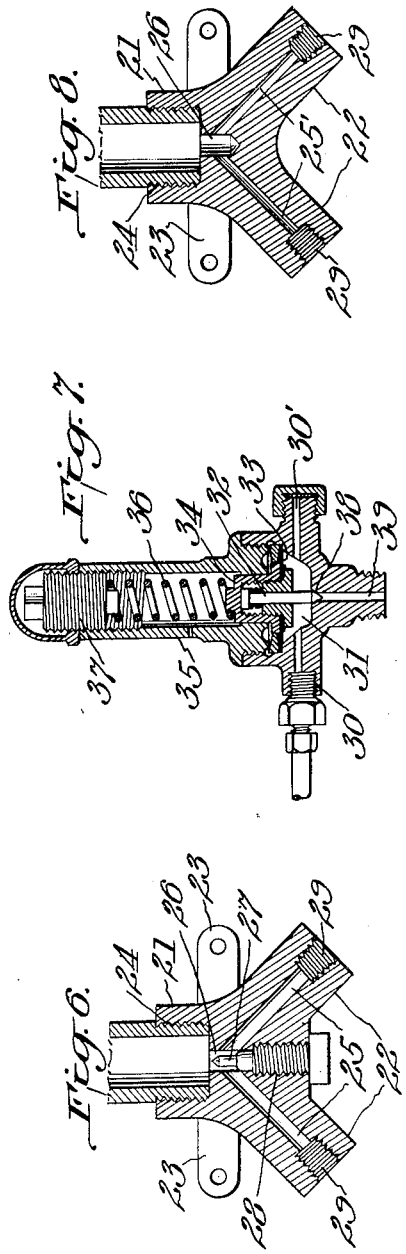
Inventor
Frank William Edwards
by
Wm H Fincel
Attorney

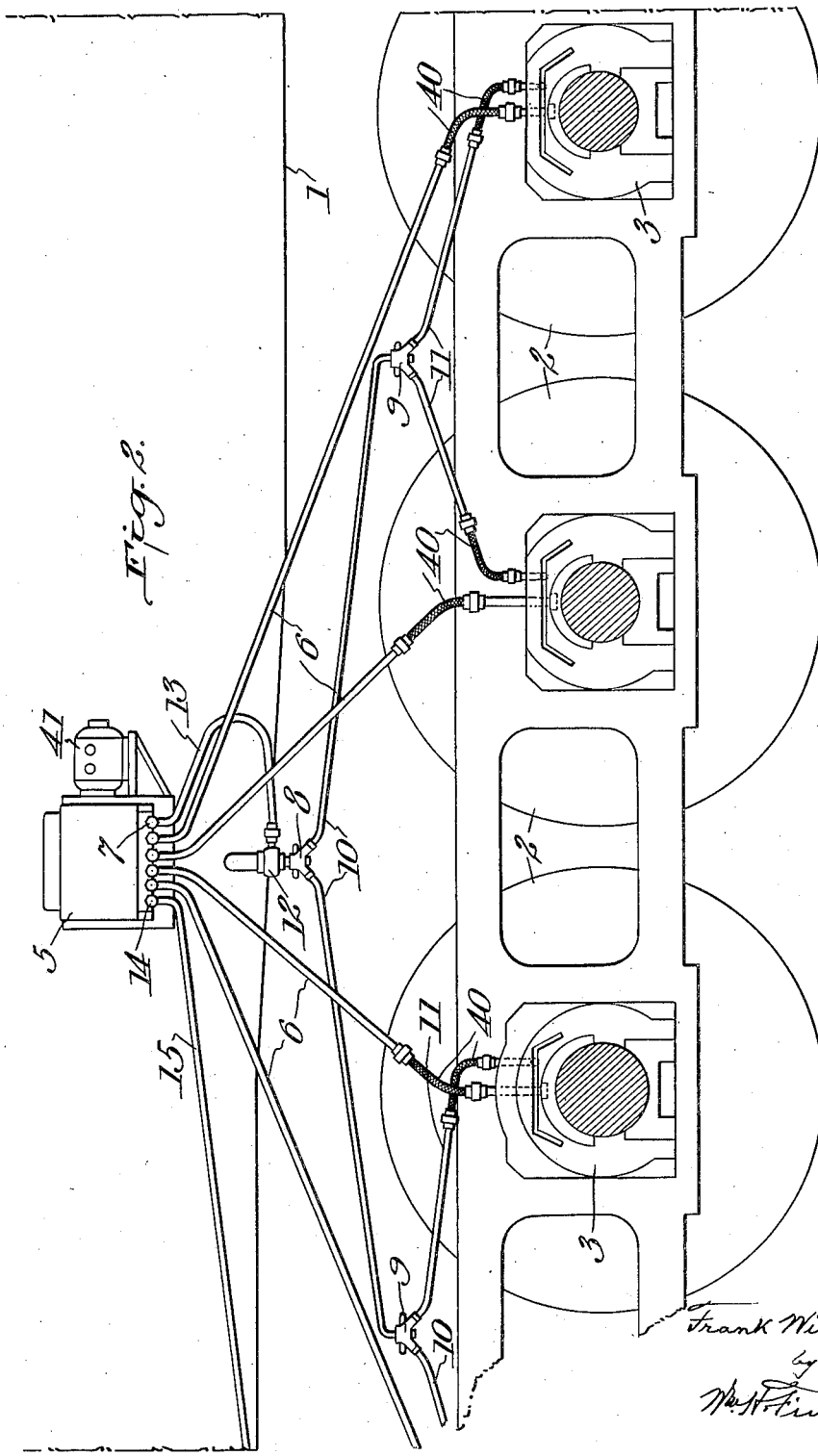

July 4, 1933.  F. W. EDWARDS  1,917,191
LUBRICATION ASSEMBLY FOR LOCOMOTIVES
Filed Dec. 6, 1930    5 Sheets-Sheet 3
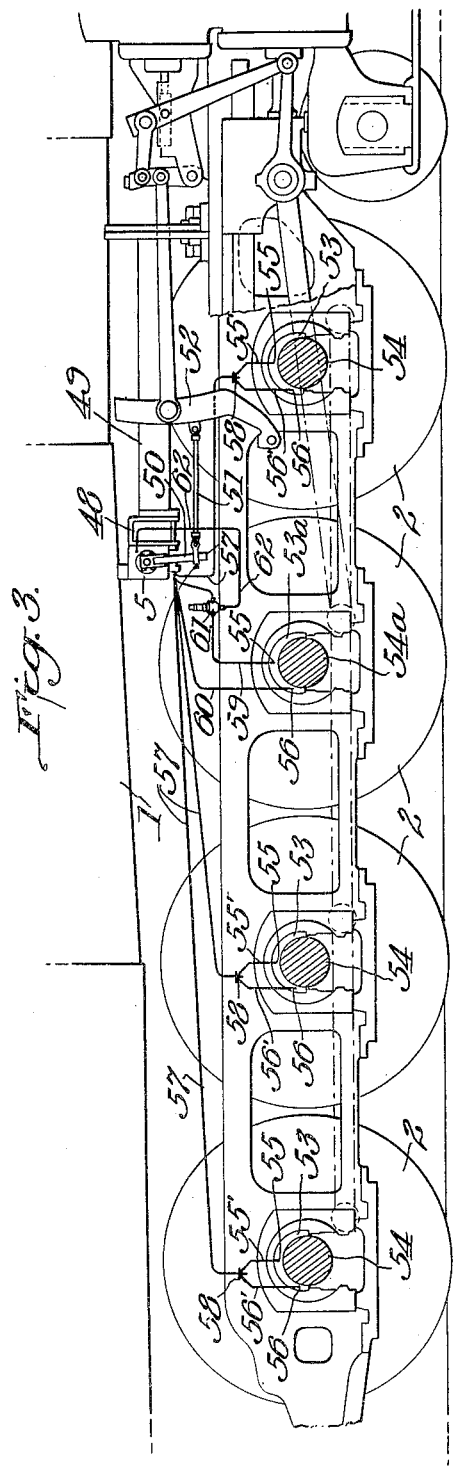
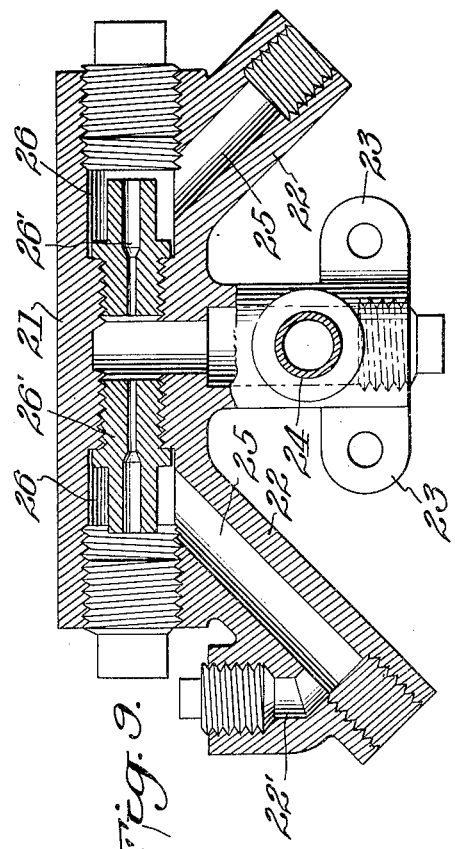
Inventor
Frank William Edwards
by
Attorney

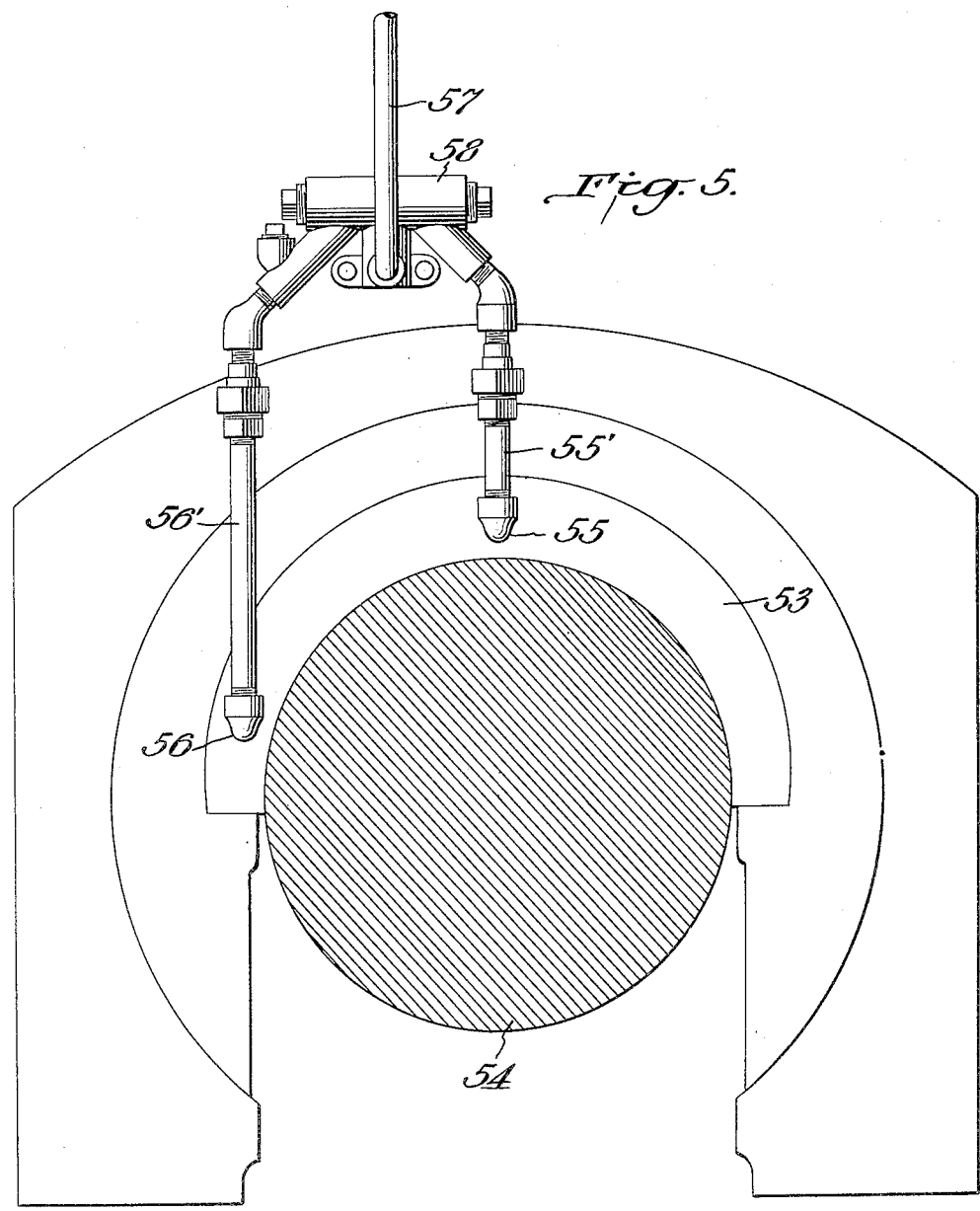

Patented July 4, 1933

1,917,191

UNITED STATES PATENT OFFICE

FRANK WILLIAM EDWARDS, OF CHICAGO, ILLINOIS, ASSIGNOR TO THE OHIO INJECTOR COMPANY OF ILLINOIS, OF CHICAGO, ILLINOIS, A CORPORATION OF ILLINOIS

LUBRICATION ASSEMBLY FOR LOCOMOTIVES

Application filed December 6, 1930. Serial No. 500,623.

This invention relates to an assembly of apparatus for supplying lubricant in adequate quantities to various points on machinery, particularly locomotives.

Specifically, the invention relates to an assembly of apparatus for lubricating the axle brasses and hub liners of locomotive drive wheels, and also for lubricating the cross-head guides, the assembly being such as to provide adequate distribution of lubricant, preferably from a multiple feed lubricator, to a plurality of such points, the amount of lubricant supplied for providing adequate lubrication at these several points making possible the division of one or more of the feeds from the lubricator so as to provide for the supplying of lubricant from such feed or feeds to a plurality of points, as I will proceed now to explain more fully and finally claim.

In the accompanying drawings illustrating the invention, in the several figures of which like parts are similarly designated, Figure 1 is a schematic sectional side elevation of a locomotive having applied thereto a lubrication assembly in accordance with my invention. Fig. 2 is a fragmentary view similar to Fig. 1, drawn upon a much larger scale. Fig. 3 is a schematic fragmentary sectional elevation, similar to Fig. 2, illustrating a modified embodiment of the lubrication assembly of the invention. Fig. 4 is an enlarged sectional elevation illustrating a preferred assembly of apparatus for supplying lubricant to the No. 2, or main driver, axle brasses. Fig. 5 is a greatly enlarged fragmentary sectional elevation showing the arrangement of apparatus for supplying lubricant to the axle brasses of driver axles other than the main driver axle. Fig. 6 is an enlarged axial sectional view of a form of manifold or "split" suitable for use in my assembly. Fig. 7 is an axial sectional elevation of one form of pressure responsive terminal valve suitable for the purposes of my invention. Figs. 8 and 9 are views similar to Fig. 6 but showing modified forms of manifolds or "splits".

In Figs. 1 and 2 of the drawings I have shown a locomotive 1 of the type provided with eight drive wheels 2, thus having eight sets of axle brasses (not shown) and eight hub liners 3, to all of which lubricant in quantities adequate to guard against friction and wear must be supplied. In addition, there are also two sets of cross-head guides 4 which also must be lubricated, preferably at two points throughout their length.

In order to supply lubricant to these twenty points, I have found that by the employment of an assembly of elements in accordance with my invention, adequate lubrication may be obtained from two lubricators provided with six feeds, one of which lubricators is preferably mounted at each side of the locomotive. These lubricators 5, only one of which is shown, may be of the motor-driven mechanical type, such as those disclosed in my co-pending application for patent for lubricating apparatus, filed October 26, 1929, Serial No. 402,719, allowed July 13, 1932, and in the co-pending application of Frank W. Edwards and Fordyce B. Farnsworth for patent for mechanical lubricator with individual motor-drive, filed October 30, 1929, Serial No. 403,537.

Due to the fact that the axle brasses require rather copious lubrication, I have found it advisable to supply lubricant to each of same directly from an individual feed of the lubricator so that each of such feeds supplies its full quota of lubricant to the axle brass with which it is connected. Such feeds are indicated by the numeral 6.

For the purpose of supplying adequate quantities of lubricant to the hub liners, however, I have found that a single feed 7 from the lubricator may be so connected as to have the lubricant pumped thereto by the lubricator divided into four parts and directed to four of the hub liners as by means of the "splits" 8 and 9 and the branch conduits 10 and 11, a pressure operated check valve 12, similar to that shown in Fig. 7, or to that disclosed in my co-pending application for patent for Pressure operated valves, filed Feb. 5, 1931, Serial No. 513,706, being interposed in the main supply line 13 from this feed 7 of the lubricator for regulating the pressure at which the lubricant is fed to the various branches 10 and 11 to an amount predetermined as necessary for furnishing an adequate feed of lubricant to each hub liner.

From another feed 14 of the lubricator I run a conduit 15 and divide the lubricant supplied to this conduit by means of "splits" 16 and 17 and branch conduits 18 and 19 into four feeds terminating at the cross-head guides 4 at the right and left hand sides of the locomotive for supplying lubricant to these guides at appropriate points thereon. The pressure of the lubricant supplied to the conduit 15 is regulated prior to its passage into the conduits 18 and 19 by means of a check valve 20, similar to the check valve 12, and for a similar purpose.

The splits or manifolds 8, 9, 16 and 17 may be either of the type shown in Fig. 6 or of the modified forms shown in Figs. 8 and 9. These splits or manifolds comprise a body 21 and divergent branches 22. The body 21 may be provided with ears 23 which may be bolted or otherwise attached to any suitable bracket or other supporting member. The body 21 is also provided with a bore 24 into which may be screwed a conduit or pipe, such as the conduits 10, 11, 18 and 19, or for connection with one of the terminal check valves 12 or 20 of either of the types mentioned, or other appropriate types. The two divergent branches 22 of the body are bored, as indicated at 25, and these bores 25 communicate with a bore or passage 26 so as to be supplied with lubricant from the connection at 24.

In the form of manifold or "split" shown in Fig. 6, I provide a regulating needle valve 27 screwthreaded into the body, as indicated at 28, and adjustable therein so as to control the amount of lubricant passing into the bores 25 and thence into the pipes or conduits leading therefrom and connected therewith by means of suitable unions or other connections at 29.

In the form of manifold or "split" shown in Fig. 8, instead of providing a regulating needle valve, such as the valve 27 of Fig. 6, I form the bores 25' of such diameter as to permit passage therethrough of lubricant at a predetermined necessary rate of feed, thus making unnecessary any adjustable controlling means.

In the form of manifold or "split" shown in Fig. 9, I provide the bore or passage 26 with removable choke plugs 26' for controlling the rate of feed of lubricant into the bores 25 of the divergent branches 22. These choke plugs may be replaced by ones having larger or smaller bores as requirements of rate of lubricant feed dictate. Moreover, if desired, one or both of the branches 22 may be provided with inlet bosses 22' adapted to receive oil cups or the like for supplying additional lubricant to the bores 25 when required.

The check valve shown in Fig. 7 is of a well-known type, and is similar to that shown in the patent of Alfred S. Osbourne, No. 1,655,772, dated January 10, 1928. In the installation of a valve of this type in my lubrication assembly, lubricant is fed under pressure from the feed or delivery port of the lubricator 5 through a conduit connected by a suitable union or other means at 30 into the chamber 31 of the valve. In this chamber is arranged a pin valve 32 carried by a diaphragm 33 and having a diaphragm and pin valve retainer member 34 reciprocable in the tubular portion 35 of the check valve body. This member 34 is backed up or loaded by a spring 36 which bears against an adjustable plug 37 screwthreaded into the part 35 whereby the pressure upon the member 34 and hence upon the diaphragm 33 may be regulated so as to permit unseating of the pin valve 32 at any desired predetermined pressure of lubricant within the chamber 31 acting upon the diaphragm 33. When the pin valve 32 is closed under the influence of the spring 36 and diaphragm 33 it seats normally at 38 in an outlet bore 39, and when it is unseated under the influence of lubricant under pressure in the chamber 31, it permits the lubricant to flow from the pipe connected at 30 through the outlet bore 39. By means of the installation of check valves of this or similar types at the points hereinabove referred to, as indicated at 12 and 20, it will be seen that by appropriate adjustment of the plug 37 to permit the opening of the pin valve 32 at a certain pressure, lubricant at a pressure which has been predetermined as necessary for providing an adequate supply of lubricant to the points to be lubricated connected with the terminal valve may be insured.

It will be noted that where lubricators 5 provided with individual driving motors 41 are used, the controls for such motors are located in the locomotive cab. As shown in Fig. 1, where only one lubricator is illustrated, this control includes a switch 42 arranged in one of the wires 43 leading to the line, the other such wire 44 leading direct to the motor. Also connected with the motor terminals are wires 45 and 46 which provide a circuit through a lamp 47 arranged in the cab. Thus, when the switch 42 is closed and a circuit is established through the motor 41 a circuit will also be established through the lamp 47 and the engineman will be apprised of the fact that the motor 41 is operating the lubricator. Therefore, when the locomotive goes out of service, or remains standing for a relatively long period, and no lubricant need be fed by the lubricator 5 the engineman will be aware that his switch 42 should be opened if he sees the lamp 47 lighted.

In Figs. 3, 4 and 5 I have illustrated a modified assembly of apparatus and, in addition, have shown a mechanically driven lubricator as distinguished from the motor driven lubricator previously referred to.

In this modified assembly the lubricator 5 which is preferably of the same type as that described with reference to Figs. 1 and 2, is mounted upon a bracket 48 carried by a part 49 of the locomotive frame. This lubricator is provided with a mechanical ratchet drive mechanism including a swinging arm 50 adapted to be oscillated by means of a rod 51 connected with a moving part 52 of the link motion of the locomotive. By these means it will be apparent that so long as the locomotive is moving, whether under power or drifting, the lubricator 5 will be operated.

The axle brasses 53 of all of the driver axles 54 including the brasses 53ᵃ of the main driver axle 54ᵃ are supplied with lubricant at two points, viz., diametrical top and rising side, indicated at 55 and 56, respectively, and in the case of each of the brasses, except those of the main driver axle 54ᵃ, these two points may be supplied with lubricant through a pipe or conduit 57 from a single feed of the lubricator and the lubricant thus fed is divided by means of a manifold or "split" 58, preferably of the type illustrated in Fig. 9, and pipes or conduits 55′ and 56′. The rate of feed to the two points may be controlled by the use of appropriately bored choke plugs 26′. This arrangement is illustrated in detail in Fig. 5.

In the case of the main driver axle 54ᵃ, however, it is advisable, because of the excessive wear occurring, to supply each point of lubrication with a separate feed direct from the lubricator, as indicated by the conduits 59 and 60, Figs. 3 and 4.

It has been found, in practice, that when the locomotive is standing, and sometimes even when the locomotive is drifting, the pressure of the axle brasses upon the axles is so great as to seal the lubricant passages at the tops of the brasses. This is particularly noticeable in regard to the main axle brasses and is apt, when the lubricator continues to pump lubricant, to result in injury to the pump lubricator or to have other mechanism of the lubricator or to have other injurious effects due to the excessive pressures created. In order to guard against such a condition, I interpose in the conduit 59 a pressure operated valve 61 similar to that shown in Fig. 7, or to that of my copending application referred to, but so arrange it that one portion of the conduit 59 is connected with the inlet 30 and the other portion with the inlet 30′, and from the outlet 39 controlled by the pin valve 32 I run a pipe 62 back to the reservoir of the lubricator 5. The spring 36 of the valve may be adjusted to permit the pin valve to open at a pressure which, if further increased, would cause injury. With this arrangement, it will be seen that so long as the lubricant feeds freely to the top port in the brass with which the conduit 59 is connected, the flow of same will be continuous through the chamber 31 of the valve from port 30 to port 30′. If, however, stoppage occurs, and pressure builds up in chamber 31 to an extent sufficient to unseat the pin valve 32, the lubricant will be by-passed through the outlet 39 and pipe 62 back to the reservoir of the lubricator.

Although I have shown and described this last described assembly only in connection with the feed lines leading to the top points of the main driver axle brasses, it will be understood that it may be made in any of the other feed lines in which its function is required or desired.

Inasmuch as the lubricator 5 is normally mounted upon the frame of the locomotive, and both the axle brasses and hub liners are movable relatively thereto, it may be found advisable to provide all of the conduits leading to such axle brasses and hub liners with relatively flexible inserts, such as the members 40 of armored tubing, indicated in Fig. 2.

It is to be understood, of course, that the lubricators 5 used are preferably of such a type that the rate of feed or pumping of oil by them to their various feeds or deliveries may be adjusted, so that the proper quantity of lubricant may be thus supplied to the points to be lubricated. It will also be noted that by the inclusion in the installation or assembly, as illustrated in Figs. 1 and 2, of the terminal valves, the pressure of feed of lubricant into the branch conduits may readily be adjusted to the required amount.

By the assembly of my invention it will be seen that I am enabled to supply from a single multiple feed lubricator, adequate quantities of lubricant to a plurality of points requiring lubrication, where the amount of lubricant required for such adequate lubrication varies or is different at some of such points from that which is required at others of such points, and that all of the feeds may, if desired, be adjusted in accordance with the conditions presented at the various points of delivery.

I thus obviate the necessity for the provision of a number of separately controlled lubricators for supplying lubricant to the various points mentioned which require lubrication, and embody in a single installation means whereby lubricant may be fed from a single source (the lubricator 5) to a plurality of points in desired, varying, adequate amounts.

Furthermore, by means of the modified installation illustrated in Figs. 3, 4 and 5, I am enabled to supply lubricant in adequate quantities to those points of the driver axle brasses where it is most needed, and to guard against injury to the lubricator and connections which might occur due to the establishing of excessive lubricant pressures.

Various changes are contemplated as within the spirit of the invention and the scope of the following claims.

What I claim is:—

1. In a lubrication assembly for locomotives, the combination with the axle brasses of the driver axles of such locomotives, of means including a force feed lubricator and conduits for supplying lubricant to each of said brasses at two points radially thereof, one of said points being at substantially the diametrical top of each of said axles, said last mentioned point being at times subject to sealing so that lubricant cannot pass, and means interposed in the feed conduit leading to said point for by-passing lubricant back to the lubricator upon occurrence of such sealing.

2. In a lubrication assembly for locomotives, the combination with the axle brasses of the driver axles of such locomotives, of means including a force feed lubricator and conduits for supplying lubricant under pressure to each of said brasses at the top and rising side thereof, the brasses of the main driver axle being provided with conduits extending direct from said lubricator to each of said points, and each of the brasses of the other driver axles having both points connected with a single feed conduit from said lubricator, said last mentioned conduit being provided with a manifold whereby the lubricant is divided into two streams and conducted thence to said two points.

In testimony whereof I have hereunto set my hand this 4th day of December, A. D. 1930.

FRANK WILLIAM EDWARDS.